United States Patent [19]

Huang et al.

[11] Patent Number: 5,188,996
[45] Date of Patent: Feb. 23, 1993

[54] REDISPERSION OF NOBLE METAL ON LOW ACIDITY SUPPORT

[75] Inventors: Tracy J. Huang, Lawrenceville, N.J.; Ying-Yen P. Tsao, Lahaska, Pa.

[73] Assignee: Mobil Oil Corp., Fairfax, Va.

[21] Appl. No.: 704,152

[22] Filed: May 22, 1991

[51] Int. Cl.$^5$ .................. B01J 23/96; B01J 38/44; B01J 21/08; B01J 21/20
[52] U.S. Cl. ........................... 502/37; 208/140; 502/230; 502/261; 502/262; 502/339
[58] Field of Search ............... 502/37, 35, 36, 230, 502/261, 262; 208/140

[56] References Cited

U.S. PATENT DOCUMENTS

| | | | |
|---|---|---|---|
| 3,937,660 | 2/1976 | Yates et al. | 208/140 |
| 3,943,052 | 3/1976 | Kmak et al. | 208/140 |
| 3,986,982 | 10/1976 | Crowson et al. | 252/415 |
| 4,444,897 | 4/1984 | Fung et al. | 502/37 |
| 4,447,551 | 5/1984 | Fung et al. | 502/37 |
| 4,467,045 | 8/1984 | Fung | 502/35 |
| 4,518,708 | 5/1985 | Krishnamurthy et al. | 502/230 |
| 4,645,751 | 2/1987 | McCullen et al. | 502/37 |
| 4,657,874 | 4/1987 | Borghard et al. | 502/35 |
| 4,678,764 | 7/1987 | Le et al. | 502/26 |
| 4,929,576 | 5/1990 | Tsao et al. | 502/35 |

OTHER PUBLICATIONS

Foger, K., et al., "Redispersion of Pt-Ir Supported ongamma Al$_2$O$_3$ and SiO$_2$ in Chlorine-Containing Gases," Journal of Catalysis 96, 170-181 (1985).

Foger, K., et al., "The Effect of Chlorine Treatment on the Dispersion of Platinum Metal Particles Supported on Silica and gamma-Alumina," Journal of Catalysis 92, 64-78 (1985).

Primary Examiner—Paul E. Konopka
Attorney, Agent, or Firm—Alexander J. McKillop; Charles J. Speciale; Dennis P. Santini

[57] ABSTRACT

A process is described for redispersing agglomerated metal on a catalyst. The catalyst comprises noble metal on a low acidity oxide support, and the process comprises contacting the catalyst with a gas stream containing about 3 to about 6 Torr chlorine and about 250 to about 750 Torr oxygen under conditions sufficient to achieve redispersion.

13 Claims, 3 Drawing Sheets

FRESH (SERIES C)

FRESH (SERIES D)

SINTERED (SERIES C)

SINTERED (SERIES D)

TREATED AT 320° C

TREATED AT 360° C

TREATED AT 400° C

TREATED AT 450° C

Pt (111)

TREATED AT 480° C 40.0°

REDISPERSION OF NOBLE METAL ON LOW ACIDITY SUPPORT

BACKGROUND OF THE INVENTION

The invention relates to a procedure for reactivating catalysts which comprise noble metal such as platinum supported on a refractory oxide of low acidity, particularly silica.

Supported metal catalysts are known to have a wide variety of catalytic applications, for example, in hydrogenations and dehydrogenations. A mild hydrogenation of unsaturated hydrocarbons has important uses in petroleum processing, and also in the pharmaceutical, food, cosmetic and photography industries. The properties of supported metal catalysts depend on the properties of both the metal and the support.

Noble metals are known to have catalytic activity in converting organic compounds. For example, such metals may be used in the hydrogenation and dehydrogenation of hydrocarbons. It will be noted that noble metals, such as platinum, are extremely expensive and rare. Accordingly, when these materials are used as catalysts they are generally uniformly distributed on a suitable support material. In this regard, the noble metal should be as finely dispersed as possible in order to provide a maximum surface area for contact with reactant molecules.

A number of materials have been used to support noble metal catalysts. These materials may be either essentially catalytically inactive or also possess catalytic properties which function in an additive or synergistic fashion with the catalytic properties of the noble metal. An example of an essentially catalytically inactive support material is gamma-alumina. An example of a catalytically active support material is an acidic aluminosilicate zeolite. Such zeolites have acid catalytic activity such as the cracking of hydrocarbons. Accordingly, a noble metal suitably supported on an appropriate zeolite may provide an excellent hydrocracking catalyst, wherein acid sites on the zeolite promote the cracking of hydrocarbons, while the noble metal, in close proximity to these acid sites, promotes the hydrogenation of the cracked products.

When relatively mild catalytic conditions are needed, it is desirable to use an inactive, amorphous support, such as silica, with a highly dispersed metal phase. Amorphous is intended to mean non-crystalline. The use of silica gel as a support is described, for example, in U.S. Pat. No. 3,969,274. Inactive supports do not interact with the metal to increase acid catalytic activity.

When solid support or catalytic materials are exposed to hydrocarbons for prolonged periods of time, particularly at elevated temperatures, the catalysts become deactivated due to the deposition on the catalyst of carbonaceous residues, e.g. coke. To restore activity, this carbonaceous residue must be removed. One way of removing coke is to oxidize (e.g. burn) off the hydrocarbonaceous deposit by exposing the catalyst to a source of oxygen (e.g. air), at elevated temperatures. However, the severe conditions encountered in oxidations may have a detrimental effect on certain supported noble metal catalysts. More particularly, as pointed out in U.S. Pat. No. 4,657,874, the entire disclosure of which is expressly incorporated herein by reference, when highly siliceous noble metal-containing zeolites are subjected to coke-burnoff, the noble metal thereof agglomerates, thereby substantially reducing the surface area of the noble metal. Note particularly, Example 5 of U.S. Pat. No. 4,657,874. The agglomerated noble metal on the zeolite can be redispersed by certain chemical treatments, but, as pointed out in this Example 5, this redispersion falls short of achieving the original level of high dispersion of noble metal before agglomeration.

The nature of the support material can have a profound effect on the manner in which noble metals can be distributed thereon under various conditions. As mentioned hereinabove, noble metals can be very finely distributed on highly siliceous zeolites. However, when subjected to the conditions of coke burn-off, this distribution is disturbed and agglomerates of noble metals form. The noble metal in these agglomerates can be only partially redistributed on the surface of the highly siliceous zeolites. In contrast to the surface of highly siliceous zeolites, the surface of gamma-alumina tends to more tenaceously hold noble metals. More particularly, noble metal supported on gamma-alumina will tend to agglomerate to a much less extent when such materials are subjected to the conditions of coke burn-off.

Examples of materials which have an entirely different surface chemistry than highly siliceous zeolites are three-dimensional microporous crystal framework structures consisting essentially of corner-sharing oxide tetrahedra of alumina and phosphorus. An example of such a material is termed an aluminophosphate in U.S. Pat. Nos. 4,310,440 and 4,385,994.

Various methods have been devised to redisperse agglomerated metals, generally employing a halogen compound. But the nature of the support material can have a serious effect on how effectively noble metals can be distributed and redistributed. While it is not intended to be bound by theory, the ability of a support material to inhibit the agglomeration of noble metal and to promote redispersion of noble metals appears to be a function of the surface chemistry of the support material, e.g. in terms of the charge and charge distribution. Because of a low surface free energy, supports having low acidity interact weakly with the metal. Each type of support, e.g. zeolites, AlPO$_4$'s, alumina, has its own distinct surface chemistry. Therefore it is impossible to predicate a model for dispersion of noble metal on silica supports based on dispersion on these other supports.

Processes which utilize chlorine and oxygen in crystalline zeolite catalyst reactivation and metal redispersion are well known. For example, U.S. Pat. No. 3,986,982 to Crowson et al. treats deactivated platinum group metal-loaded zeolites by contacting them with a stream of inert gas containing from 0.5 to 20 vol. % of free oxygen, and from 5 to 500 ppm volume of chlorine as molecular chlorine, HCl or inorganic chlorine-containing material. The resulting catalyst is purged to remove residual oxygen and chlorine and then reduced in a stream of hydrogen at 20020 –600° C.

U.S. Pat. No. 4,657,874 describes redispersing agglomerated noble metal on a high silica zeolite by contacting with inert gas containing chlorine at a partial pressure of about to about 15 Torr and water in a concentration in which the ratio of the partial pressure of water to the partial pressure of chlorine is from about 0.01 to about 2, purging with inert gas and reducing with dry hydrogen.

U.S. Pat. No. 4,678,764 describes a method for redispersing noble metal on a zeolite catalyst by contacting with a gas containing 2 to 20 Torr chlorine, 200 to 4000 Torr oxygen and above 0 to 50 Torr water.

U.S. Pat. No. 4,929,576 describes a method for redispersing agglomerated noble metal on a crystalline aluminophosphate molecular sieve by contacting with chlorine, purging, and reducing with dry hydrogen.

U.S. Pat. No. 4,518,708 describes a process for treating a fresh catalyst comprising iridium or platinum and iridium on a support such as alumina, titanium dioxide, zinc oxide, magnesia, thoria, chromia, silica-alumina, alumina-titania, silica-zirconia, alumina-thoria, etc. by contacting at 850°–1000° F. with a gas having an oxygen concentration of 0.1–50 wt. % for 0.1–24 hours, and at least 0.1 wt. % dry hydrogen halide per weight of catalyst per hour at 700°–1000° C., followed by contacting with a reducing agent at 400°–1000° F. for 0.1–24 hours.

Although methods have been described for redispersing agglomerated noble metal on zeolites, aluminophosphate molecular sieves and alumina, attempts to redisperse agglomerated noble metal supported on silica have not met with great success.

An article by Foger, K. and Jaeger, H., "The Effect of Chlorine Treatment on the Dispersion of Platinum Metal Particles Supported on Silica and Gamma-Alumina", Journal of Catalysis 92, 64–78 (1985) describes the rigorous conditions used in an attempt to redisperse platinum on silica as compared with redispersion of platinum on alumina. With Pt/SiO$_2$, redispersion was achieved only by treatment with over 25% chlorine at a temperature over 500. Kelvin. But under such severe redispersion conditions, an unwanted side effect was also observed, i.e., the treatment resulted in Pt loss from the silica support as PtCl$_2$.

Because refractory oxides such as amorphous silica are relatively inert, the propensity for agglomeration of noble metals is greater when these are used as supports. This tendency for metal agglomeration along with metal loss and further agglomeration upon applying conventional chlorine methods for metal redispersion has led to an inability to use noble metals supported on low acidity amorphous refractory oxides in many commercial applications.

Accordingly, it is an object of the invention to modify the interaction between a noble metal and an inactive amorphous support so that metal and the support possess a strong affinity to each other.

It is a more specific object of the invention to provide an effective redispersion of agglomerated platinum on silica without metal loss.

SUMMARY OF THE INVENTION

Thus, in accordance with the present invention there is provided a process for rejuvenating a catalyst composition containing agglomerated noble metal, the catalyst composition comprising a noble metal on a low activity oxide support such as oxides of silicon, germanium, tin and combinations thereof. The process comprises contacting the catalyst with a stream of gas containing a sufficient amount of chlorine and a sufficient amount of oxygen under conditions and for a period of time sufficient to achieve dispersion of the agglomerated metal.

There is more specifically provided a process for redispersion of agglomerated platinum on a low acidity refractory oxide support by contacting the metal/support composition containing agglomerated metal with an inert gas containing molecular chlorine at a partial pressure of from about 3 to about 6 Torr and oxygen at a partial pressure of about 250 to about 750 Torr, at a temperature of from 320° C. to about 450° C., for a period of time sufficient to attain redispersion of agglomerated metal without metal loss. The substantial absence of water is preferred in the process. The effectiveness of the redispersion is related to temperature and the partial pressures of chlorine and oxygen.

For a better understanding of the present invention, together with other and further objects, reference is made to the following description taken together with the accompanying drawings, and its scope will be pointed out in the appended claims.

DETAILED DESCRIPTION OF THE INVENTION

Figure 1:
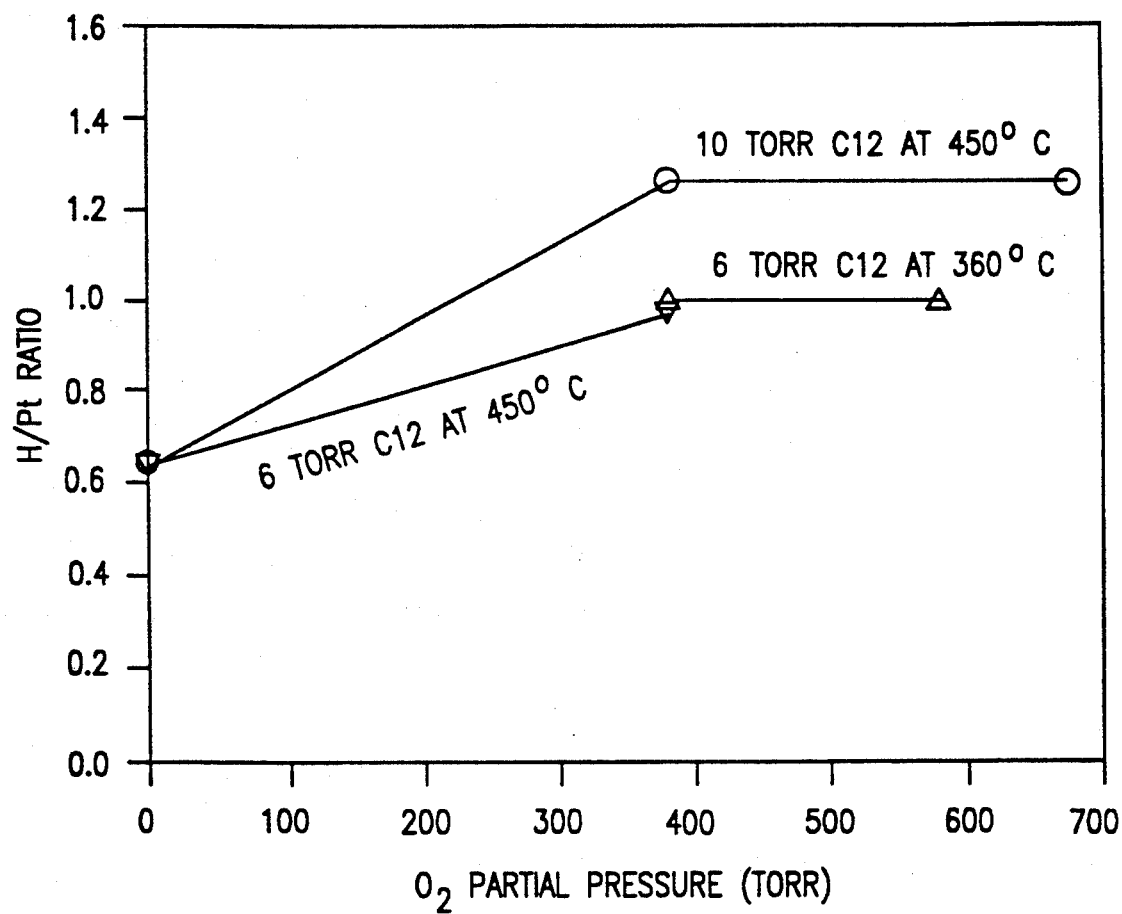
FIG. 1 is a graph illustrating the effect of oxygen on platinum redispersion on silica.

The invention further comprises a process for the repeated use of a noble metal catalyst composition with a low acidity refractory oxide support. This process comprises (a) utilizing the catalyst composition in the conversion of organic compounds whereby the catalyst is contacted with hydrocarbons, a carbonaceous deposit is formed on the catalyst and the catalytic activity is reduced; (b) subjecting the deactivated catalyst to a source of oxygen at elevated temperatures to oxidize and remove at least some of the carbonaceous deposit and wherein the noble metal becomes agglomerated; (c) redispersing the agglomerated noble metal; and (d) returning the regenerated catalyst of step (c) to use in conversion of organic compounds.

Catalysts useful herein generally include an active phase and a support. The active phase is a metal or mixture of metals such as elements in Group VIII of the Period Table of Elements, particularly ruthenium, rhodium, palladium, osmium, iridium and platinum. Noble metals are particularly effective in certain types of conversions of organic compounds Particularly preferred is platinum.

To maximize the surface of the metal active phase, it is desirable to disperse the metal in particles as small as possible onto the support.

Particularly suitable as supports herein are the refractory oxides of silicon, germanium and tin, with silica being especially preferred. Combinations of such oxides are also suitable.

Noble metal on these supports has certain catalytic properties that noble metal on alumina, silica-alumina, various other acidic cogels, zeolites, AlPO$_4$'s, MeAlPO$_4$'s and SAPO's cannot provide. Amorphous silica, for example, has very low acidity and better control of pore size distribution. A low acidity support enhances a more controlled hydrogenation as is required in the production of pharmaceuticals, saturated fatty acids, cosmetics and photographic reagents. The use of low acidity supports also gives less undesirable methane and coke formation during naphtha reforming in petroleum processing. Although active carbon has also been used as a low acidity support, it cannot be oxidatively regenerated.

Silica gel is a coherent, rigid, continuous three-dimensional network of particles of colloidal silica. There are three types of silica gels, regular, intermediate and low density. The pore size can be very large and the pore-structure determines the adsorption capacity for various molecules. Pores may be characterized by specific surface area, specific pore volume (total volume of pores per gram of solid), average pore diameter, pore-size distribution, and the degree to which entrance to larger pore is restricted by small pores. Synthetic amorphous silicas are commercially available.

In the preparation of the catalyst, the metal is generally dispersed into the support by impregnation or ion exchange using, for example, aqueous solutions of hexachloroplatinate $Pt^{IV}Cl_6)^{-2}$, $Pt(NH_3)_4^{+2}$, other platinum salts, chloride, nitrate, sulfate, oxalate and amine (ammonia/metal) complexes in aqueous solutions. Other methods of metal dispersion include codeposition and adsorption from a gaseous phase. Catalysts suitable for use in the present invention may contain from about 0.01 to about 20 percent by weight noble metal, particularly platinum. The metal is dispersed as small particles of from about 3 to about 50 Angstroms in diameter, preferably less than 15 Angstroms. The catalyst may also be bimetallic, containing a combination of two noble metals.

Dispersion of noble metals on the support can be measured by hydrogen chemisorption. This technique indicates the extent of noble metal agglomeration of a catalyst material. Details of the analytical technique may be found in Anderson, J. R., *Structure of Metallic Catalyst.* Chapter 6, p. 295, Academic Press 1975). In general, hydrogen chemisorbs selectively on the metal so that a volumetric measurement of hydrogen capacity counts the number of metal adsorption sites.

A measurement of the H/Pt ratio, for example, may be used to gauge the redispersion of the platinum on a support, that is, the exposed metal surface area. Using the invention, the metal may be effectively redispersed, for example, from an H/Pt below 0.5 to attain a H/Pt redispersed value of at least 0.8, preferably at least 1.0. Under optimal conditions, higher H/Pt ratios are obtained.

Catalytic processes which employ supported metal catalyst components such as platinum or palladium or other noble metals include hydrogenation, dehydrogenation, dehydrocyclization, isomerization, hydrocracking, dewaxing, reforming, conversion of alkyl aromatics, etc. A supported noble metal is particularly suited for isomerization of paraffins, aromatization of aliphatics and oligomerization of olefins.

In general, catalytic conversion conditions over the catalyst composition include a temperature of from about 25° to about 550° C., a pressure of from about 1 atmosphere (bar) to about 150 atmospheres (bar), a weight hourly space velocity of from about 0.1 $hr^{-1}$ to about 100 $hr^{-1}$ and a hydrogen/organic, e.g. hydrocarbon, component of from 0 to about 50.

The used catalyst may be regenerated by oxidation. For oxidative regeneration, the catalyst is contacted with an oxygen-containing gas stream to burn off deposited carbonaceous material. Suitable oxidation conditions include temperatures from about 200° to about 540° C., preferably 350° to 510° C., a pressure of atmospheric to 70 atmospheres and an oxidizing gas flow rate of from about 4.2 to about 17.0 standard cubic feet per hour per pound of catalyst. During regeneration, the noble metal becomes agglomerated.

Optionally, after oxidation and before redispersion, the catalyst may be subjected to a reduction by contacting with a stream of hydrogen under suitable reaction conditions. These conditions include a temperature of from about 100° to about 450° C. for a time of from about 20 minutes to about 24 hours, at a hydrogen partial pressure of 0.1 atmospheric to about 150 atmospheres.

The invention may be used to reactivate supported noble metal catalysts which have become deactivated and the metal agglomerated during hydrocarbon processing such as hydrogenation with subsequently oxidative regeneration or in which the noble metal has been sintered by contact with high temperature processes.

When metal agglomerates, it forms undesirable large clumps, e.g. over 50 Angstroms in contrast to a most preferred dispersion particle size of less than about 15 Angstroms.

The agglomerated metal may be redispersed on the support by contacting the catalyst with inert gas containing chlorine and oxygen at a temperature of from about 320° C. to about 450° C. for a period of time to attain redispersion. A preferred temperature range is from about 360° C. to about 420° C. The inert gas may comprise nitrogen (or helium). The time of contacting is set to be sufficient to attain redispersion of agglomerated metal without metal loss. It may be from about 2 to about 10 hours, preferably from about 4 to about 8 hours.

To prevent metal loss, chlorine partial pressure must be limited. The presence of oxygen is also required. The presence of water reduces the redispersion effectiveness.

For redispersion treatment, the chlorine is at a pressure of from about 3 to about 6 Torr with from about 4 to about 6 Torr preferred. The chlorine may be provided as molecular chlorine ($Cl_2$) or from organic precursors of molecular chlorine. Although water is preferably absent, an amount of up to about 10 Torr is tolerated; and when $Cl_2$ partial pressure is below 4 Torr, about 50 Torr of water is tolerated. The oxygen pressure is from about 250 to about 750 Torr with from about 350 to about 750 Torr preferred.

The following examples are provided to illustrate the invention.

EXAMPLES 1-41

Batches of fresh Pt/silica catalyst, series A through G, were prepared using the same silica support (Grade 12 silica gel, Davison Chemical).

To produce the catalysts used in this study, we exchanged a 20 gram sample of silica gel under basic conditions with $Pt(NH_3)_4^{++}$. A $Pt(NH_3)_4(NO_3)_2$ solution was prepared by mixing 10 parts by volume of a $3.1 \times 10^{-3}$ molar stock solution of $Pt(NH_3)_4(NO_3)_2$ with one part by volume of a $3.1 \times 10^{-3}$M $Pt(NH_3)_4(OH)_2$ solution. This 250 ml solution was added dropwise with stirring over the course of two hours to the 20 grams of silica gel suspended in 200 ml of distilled water. During the exchange, the pH of the solution increased only slightly from 3.1 to 3.2. After all 250 ml of the $Pt(NH_3)_4^{++}$ solution was added, the pH of the solution was adjusted to 9.1 with dilute $NH_4OH$.

After the dropwise addition of platinum solution was completed, the samples were allowed to stand for about 16 hours at ambient temperature then the solids were removed from each sample and water washed. The samples were dried at 120°-130° C. for about 16 hours.

The samples, except Series A, were then heated at the rate of 0.5° C. per minute in dry air to a temperature of about 350° C., held for four hours, and allowed to cool to room temperature in air. Series A was heated more rapidly.

The resulting fresh samples had a Pt content ranging from 0.48% to 0.58% by wt. of highly dispersed platinum particles in crystallites of about six to ten Angstroms. The resulting samples with platinum contents and H/Pt ratios initially and after various treatment conditions are shown in Tables 1 and 2.

The H/Pt ratio obtained from hydrogen chemisorption was used as an indicator of platinum dispersion. A higher H/Pt ratio is an indication of better platinum dispersion. The H/Pt ratio of the fresh samples generally ranged from 1.4 to 1.7 indicating that the Pt was in a highly dispersed state. The H/Pt results were consistent with the less quantitative results obtained using X-ray diffraction analysis.

X-ray Diffraction (XRD) analyses of the samples detected no X-ray Diffraction visible Pt peak indicating no large particles. STEM analysis of Example 11 in Series C confirmed that its Pt was extremely highly dispersed.

The fresh samples were sintered at 540° C. for 16 hours in an air mixture containing 15 Torr water. The resulting H/Pt ratios of the sintered samples were in the range of 0.3 to 0.4 except when the sintering conditions were milder. XRD and STEM analysis indicated that the Pt on the sintered samples was extensively agglomerated.

Chlorine redispersion treatments of the sintered catalysts were performed at 320°–480° C. for 2–8 hours varying the oxygen and water for various samples. $Cl_2$ partial pressures were varied from 3 to 90 Torr. The listed gas mixtures were inlet concentrations. The corresponding in-situ concentrations deviated somewhat due to Deacon reaction which generates HCl and more $O_2$ through interaction between $Cl_2$ and water. Prior to chlorine mixture treatments, all of the air sintered samples (except example 10) were hydrogen (760 Torr) reduced at 420° C. for 1 hour. Chlorine redispersion conditions and results for Series A–F are listed in Table 1.

In Series G, a fresh sample was sintered as described above and treated in a repeat cycle. Conditions and results for Series G are shown in Table 2.

TABLE 1

Chlorine Treatments of Agglomerated Pt on Silica

| Examples | Treatment Conditions | | | | | | Analysis | |
|---|---|---|---|---|---|---|---|---|
| | Gas Mixture (Torr) | | | | Temp (°C.) | Duration (h) | Pt** Content | H/Pt Ratio |
| | $Cl_2$ | $H_2O$ | $O_2$ | $N_2$ | | | | |
| Series A | | | | | | | | |
| 1 | Fresh | | | | | | 0.55% | 0.95 |
| 2 | Wet Air sintered at 540° C. for 16 hrs. | | | | | | 0.55% | 0.27 |
| 3 | 10 | 10 | 380 | 360 | 450 | 4 | 0.51% | 1.08 |
| Series B | | | | | | | | |
| 4 | Fresh | | | | | | 0.58% | 1.42 |
| 5 | Wet Air sintered at 540° C. for 16 hrs. | | | | | | 0.58% | 0.33 |
| 6 | 10 | 0 | 380 | 370 | 450 | 4 | 0.53% | 1.27 |
| 7 | 10 | 0 | 676 | 74 | 450 | 4 | 0.47% | 1.26 |
| 8 | 10 | 0 | 0 | 750 | 450 | 4 | 0.46% | 0.64 |
| 9 | 10 | 10 | 380 | 360 | 450 | 4 | 0.51% | 1.05 |
| 10* | 10 | 10 | 380 | 360 | 450 | 4 | 0.53% | 0.90 |
| Series C | | | | | | | | |
| 11 | Fresh | | | | | | 0.48% | 1.72 |
| 12 | Wet air sintered at 540° C. for 16 hrs. | | | | | | 0.47% | 0.38 |
| 13 | 6 | 0 | 380 | 374 | 400 | 4 | 0.49% | 1.34 |
| 14 | 6 | 0 | 380 | 374 | 450 | 4 | 0.48% | 0.97 |
| 15 | 6 | 0 | 0 | 754 | 450 | 4 | 0.45% | 0.64 |
| 16 | 6 | 0 | 380 | 374 | 480 | 4 | 0.48% | 0.53 |
| 17 | 6 | 0 | 380 | 374 | 450 | 2 | 0.47% | 0.55 |
| Series D | | | | | | | | |
| 18 | Fresh | | | | | | 0.51% | 1.58 |
| 19 | Wet air sintered at 540° C. for 16 hrs. | | | | | | 0.53% | 0.38 |
| 20 | 6 | 0 | 380 | 374 | 360 | 4 | 0.54% | 1.00 |
| 21 | 6 | 0 | 579 | 175 | 360 | 4 | 0.53% | 1.00 |
| 22 | 6 | 0 | 380 | 374 | 320 | 4 | 0.55% | 0.75 |
| 23 | 6 | 10 | 380 | 364 | 400 | 3.5 | 0.52% | 0.87 |
| 24 | 3 | 50 | 380 | 327 | 320 | 8 | 0.51% | 0.84 |
| 25 | 6 | 10 | 380 | 364 | 400 | 3.5 | 0.52% | 0.87 |
| Series E | | | | | | | | |
| 26 | Fresh | | | | | | 0.50% | 1.65 |
| 27 | Wet air sintered at 540° C. for 16 hrs. | | | | | | 0.50% | 0.39 |
| 28 | 6 | 0 | 380 | 374 | 320 | 8 | 0.50% | 0.89 |
| 29 | 6 | 50 | 380 | 324 | 320 | 2 | 0.49% | 0.67 |
| 30 | 10 | 50 | 380 | 320 | 320 | 8 | 0.45% | 0.87 |
| 31 | 90 | 0 | 0 | 670 | 400 | 4 | 0.45% | 1.04 |
| Series F | | | | | | | | |
| 32 | Fresh | | | | | | 0.50% | 1.65 |
| 33 | Wet air sintered at 540° C. for 10 hrs. | | | | | | 0.51% | 0.57 |
| 34 | 6 | 10 | 380 | 364 | 360 | 6 | 0.51% | 1.11 |

*Prior to chlorine redispersion, a 420° C. hydrogen reduction was not applied.
**Repeatability of Pt elemental analysis was within 0.02% by weight.

TABLE 2

Series G
Multi-cycle Chlorine Treatments of Agglomerated Pt/Silica

| Examples | Status or Treatment Condition | | Analysis | |
|---|---|---|---|---|
| | | | Pt (**) Content | H/Pt Ratio |
| 35 | Fresh | | 0.51% | 1.58 |
| 36 | Wet (*) air sintered at 540° C. for 16 hours | | 0.53% | 0.38 |
| 37 | I. | $H_2$ reduced at 420° C. for 1 hour | — | — |
| | II. | 6 Torr $Cl_2$/50 Torr water/ 380 Torr $O_2$/324 Torr $N_2$ treated at 320° C. for 8 hours | | |
| | III. | Wet air (*) sintered at 540° C. for 6 hours | | |
| 38 | Repeat one more cycle of the same treatment as in Example 37 | | — | — |
| 39 | I. | $H_2$ reduced at 420° C. for 1 hour | | |
| | II. | 6 Torr $Cl_2$/50 Torr water/ 380 Torr $O_2$/324 Torr $N_2$ treated at 320° C. for 8 hours | 0.51% | 0.60 |
| 40 | Wet air (*) sintered at 540° C. for 6 hours | | 0.51% | 0.37 |
| 41 | I. | $H_2$ reduced at 420° C. for 1 hour | | |
| | II. | 6 Torr $Cl_2$/50 Torr water/ 380 Torr $O_2$/374 Torr $N_2$ treated at 360° C. for 8 hours | 0.51% | 1.09 |

(*) Containing 15 Torr water
(**) Repeatability of Pt elemental analysis was within 0.02% by weight.

EXAMPLE 42

A benzene hydrogenation activity (BHA) test was carried out to determine the effectiveness of the redispersion. Standardized test conditions were 100° C., atm pressure, $pH_2 = 730$ torr, pBenzene = 30 torr, and WHSV = 5 hr$^{-1}$. The redispersed catalyst of Example 13 was tested against the fresh catalyst of Example 11 and sintered catalyst of Example 12. The results are shown in Table 3.

TABLE 3

Catalytic Test of Pt/Silica Catalysts

| Catalyst | BHA at 100° C. (Moles benzene converted per mole Pt per hour) |
|---|---|
| Fresh | 304 |
| Sintered | 82 |
| Redispersed | 352 |

The results show that the redispersed catalyst treated according to the invention has a better hydrogenation activity than the fresh catalyst and much higher activity than the sintered catalyst.

Figure 2:
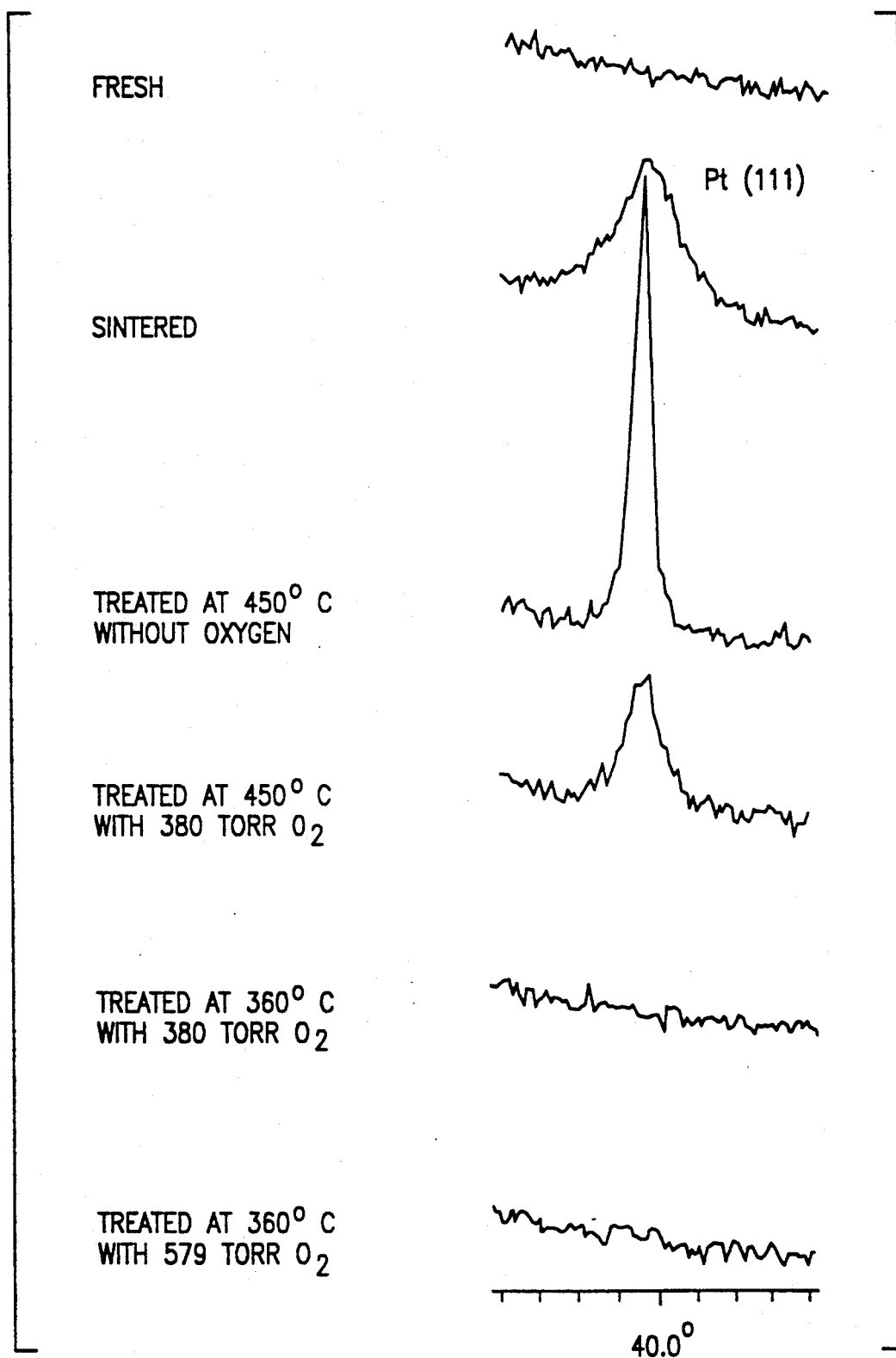
FIG. 2 is a comparison of X-ray Diffractions of dispersed platinum on silica under various treatment conditions involving oxygen.

The overall results of the examples led to several conclusions. Series A increased the H/Pt ratio but resulted in a Pt loss of about 7%. However, the chlorine and oxygen appear to function together to anchor the metal to the support surface. The importance of oxygen in conjunction with chlorine in the treatment method is illustrated in the comparisons shown in FIGS. 1 and 2. In Series B, without oxygen, metal loss occurred. Series B shows that the presence of 10 Torr water also resulted in a reduction of the H/Pt. An X-ray diffraction analysis in Series B indicated the presence of large particles of Pt over 100 Angstroms in size, confirmed by STEM analysis.

One cause for the undesirable agglomeration of noble metal on low acidity supports is the presence of HCl generated in situ (Deacon reaction). But a pretreatment hydrogen reduction step improves redispersion particularly if the redispersion treatment includes the presence of water. In addition, if chlorine partial pressure is above the prescribed range, metal loss occurs.

Figure 3:
FIG. 3 is a comparison of X-ray Diffractions of dispersed platinum on silica under various temperature conditions.
Figure 3:
Figure 3:
Figure 3:
Figure 3:
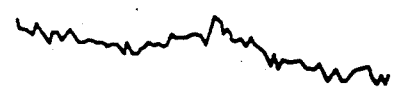
Figure 3:
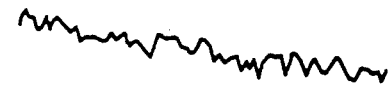
Figure 3:
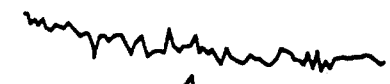
Figure 3:
Figure 3:
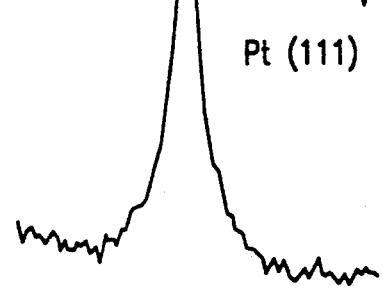

The results also show that the optimal temperature range is below 450° C. In Series C and D, milder conditions were employed including reducing the $Cl_2$ partial pressure and temperature. It can be seen that at 400° C., the resultant H/Pt ratio was 1.34, about four times the amount of its sintered parent. At 320°, 360°, 450° and 480° C., the corresponding values were 0.75, 1.00, 0.97 and 0.53 respectively. X-ray diffraction analysis illustrated in FIG. 3 showed that the higher temperatures above 400° C. were not desirable and the highest temperatures increased sintering. Conditions were varied still further in Series E-G.

A study of time duration showed that a four hour treatment yielded better results than a two hour treatment. X-ray diffraction revealed that both time durations resulted in equal amounts of remaining particles over 50 Angstroms.

The interference of water is noticeable at 6 Torr $Cl_2$ with a decrease in dispersion.

While there have been described what are presently believed to be the preferred embodiments of the invention, those skilled in the art will realize that changes and modifications may be made thereto without departing from the spirit of the invention and it is intended to claim all such changes and modifications as fall within the true scope of the invention.

What is claimed is:

1. A process for redispersing agglomerated noble metal in a catalyst composition which comprises noble metal on a low-acidity silica support said process comprising contacting the catalyst composition with an inert gas containing molecular chlorine at a partial pressure of from about 3 to about 6 Torr, oxygen at a partial pressure of from about 250 to about 750 torr and water from 0 up to about 50 Torr at a temperature of from about 320° to about 450° C., for a period of time sufficient to attain redispersion of agglomerated metal without metal loss.

2. The process of claim 1 wherein the catalyst comprises from about 0.1 to about 20 weight percent platinum.

3. The process of claim 1 wherein the catalyst comprises from about 0.1 to about 10 weight percent platinum.

4. The process of claim 1 wherein the noble metal is introduced into the support by impregnation of ion exchange.

5. The process of claim 1 which further comprises contacting the catalyst with a reducing gas at a temperature of from about 200° to about 450° C. before contacting the catalyst with the redispersing stream of gas.

6. The process of claim 5 wherein the reducing gas comprises hydrogen.

7. The process of claim 5 which further comprises contacting the catalyst at oxidation conditions sufficient to oxidize deposited carbonaceous material before contacting the catalyst with the reducing gas.

8. The process of claim 1 wherein the noble metal is selected from the group consisting of platinum, palladium, iridium, osmium, rhodium, ruthenium and mixtures thereof.

9. The process of claim 1 wherein the noble metal is platinum.

10. The process of claim 1 wherein the time is from about 2 to about 10 hours.

11. The process of claim 1 wherein the contacting is carried out in the substantial absence of water.

12. The process of claim 1 wherein the chlorine is supplied by a member of a group consisting of molecular chlorine ($Cl_2$) and organic precursors of molecular chlorine.

13. The process of claim 8 wherein the partial pressure of oxygen is from about 380 to about 750 Torr.

* * * * *